(12) United States Patent
You et al.

(10) Patent No.: US 8,808,943 B2
(45) Date of Patent: Aug. 19, 2014

(54) MEMBRANE ELECTRODE ASSEMBLY INCLUDING POROUS CATALYST LAYER AND METHOD OF MANUFACTURING THE SAME

(75) Inventors: Dae-jong You, Yongin-si (KR); Yoon-hoi Lee, Yongin-si (KR); Chan-ho Pak, Yongin-si (KR); Ji-rae Kim, Yongin-si (KR)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 1450 days.

(21) Appl. No.: 12/102,289

(22) Filed: Apr. 14, 2008

(65) Prior Publication Data
US 2008/0292942 A1    Nov. 27, 2008

(30) Foreign Application Priority Data

May 21, 2007  (KR) .................. 10-2007-0049327
Nov. 5, 2007  (KR) .................. 10-2007-0112314

(51) Int. Cl.
*H01M 4/86*    (2006.01)
*H01M 4/88*    (2006.01)

(52) U.S. Cl.
USPC ............... 429/523; 429/524; 427/115

(58) Field of Classification Search
USPC ................... 429/523, 524; 427/115
See application file for complete search history.

(56) References Cited

U.S. PATENT DOCUMENTS

| | | | | |
|---|---|---|---|---|
| 2001/0028975 | A1* | 10/2001 | Narayanan et al. | 429/42 |
| 2004/0058224 | A1* | 3/2004 | Eshraghi et al. | 429/40 |
| 2004/0248730 | A1* | 12/2004 | Kim et al. | 502/185 |
| 2005/0255347 | A1* | 11/2005 | Jacksch et al. | 429/13 |
| 2007/0269707 | A1* | 11/2007 | Lee et al. | 429/44 |

FOREIGN PATENT DOCUMENTS

| | | |
|---|---|---|
| JP | 2006-147371 | 6/2006 |
| JP | 2006147371 A * | 6/2006 |

* cited by examiner

*Primary Examiner* — Milton I Cano
*Assistant Examiner* — Brent Thomas
(74) *Attorney, Agent, or Firm* — Lee & Morse, P.C.

(57) ABSTRACT

A membrane electrode assembly for a fuel cell including a porous catalyst layer, and a method of manufacturing the same in which an electrode includes a catalyst layer formed adjacent to a surface of an electrolyte membrane, and the catalyst layer has a uniform porosity as pluralities of pores are uniformly distributed on the catalyst layer.

19 Claims, 10 Drawing Sheets

MEMBRANE ELECTRODE ASSEMBLY INCLUDING POROUS CATALYST LAYER AND METHOD OF MANUFACTURING THE SAME

CROSS-REFERENCE TO RELATED APPLICATIONS

This application claims the benefit of Korean Patent Application No. 2007-49327, filed on May 21, 2007, in the Korean Intellectual Property Office, and Korean Patent Application No. 2007-112314, filed on Nov. 5, 2007, in the Korean Intellectual Property Office, the disclosures of which are incorporated herein by reference.

BACKGROUND OF THE INVENTION

1. Field of the Invention

Aspects of the present invention relate to a membrane electrode assembly for a fuel cell and a method of manufacturing the same, and more particularly, to a membrane electrode assembly including a porous catalyst layer adjacent to a surface of an electrolyte membrane of the membrane electrode assembly for a fuel cell and a method of manufacturing the same.

2. Description of the Related Art

Fuel cells are devices in which chemical energy is converted into electrical energy through electrochemical reaction of a fuel with oxygen. Fuel cells theoretically have very high power generation efficiency since they are not based on the Carnot cycle. Such fuel cells can be used as power sources for compact electric/electronic devices, particularly portable devices, as well as for industrial, domestic, and transportation applications.

Fuel cells are classified into polymer electrolyte membrane (PEM) fuel cells, phosphoric acid fuel cells, molten carbonate fuel cells, solid oxide fuel cells, etc., according to the type of electrolyte used. The operating temperature of the fuel cell and the materials therein vary depending on the electrolyte used.

The fuel cell can be further classified according to how the fuel is fed, including an exterior reforming type that converts a fuel to a hydrogen enriched gas through a fuel reformer and feeds the hydrogen enriched gas to an anode of the fuel cell, a direct fuel feeding type that directly feeds a fuel in a gas or a liquid state to an anode, or an interior reforming type.

A representative example of the direct fuel feeding type is a direct methanol fuel cell (DMFC). In the DMFC, an aqueous methanol solution or a mixed vapor of methanol and water is generally fed to an anode. DMFCs do not require an external reformer and use fuel that is convenient to handle, and DMFCs have the highest potential for use as portable energy sources.

Electrochemical reactions occurring in a DMFC include an anode reaction in which fuel is oxidized and a cathode reaction in which oxygen is reduced into water through a reaction with protons from the oxidized fuel, and the reactions are as follows.

Anode Reaction: $CH_3OH + H_2O \rightarrow 6\,H^+ + 6\,e^- + CO_2$
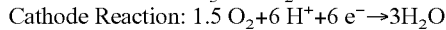
Cathode Reaction: $1.5\,O_2 + 6\,H^+ + 6\,e^- \rightarrow 3\,H_2O$
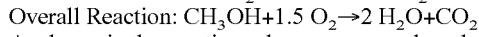
Overall Reaction: $CH_3OH + 1.5\,O_2 \rightarrow 2\,H_2O + CO_2$ As shown in the reaction schemes, one methanol molecule reacts with one water molecule at the anode to produce one carbon dioxide molecule, six protons, and six electrons. The produced protons migrate to the cathode through a proton conductive electrolyte membrane. The protons react with oxygen and electrons which are supplied via an external circuit in the cathode to produce water. In the overall reaction in the DMFC, water and carbon dioxide are produced through the reaction of methanol with oxygen. As a result, a substantial portion of the energy equivalent to the heat of combustion of methanol is converted into electrical energy. The anode and the cathode include catalysts to facilitate those reactions.

The proton conductive electrolyte membrane provides a path for the protons generated through the oxidation reaction at the anode to migrate to the cathode, and electrically separates the anode and the cathode. Generally, the proton conductive electrolyte membrane is hydrophilic, and thus the proton conductive electrolyte membrane is generally impregnated with an appropriate amount of water to increase the ionic conductivity thereof.

A portion of methanol that is fed to the anode is diffused to the hydrophilic proton conductive electrolyte membrane and migrates to the cathode. Such migration of methanol is a methanol cross-over. Typically, the cathode of the DMFC includes a platinum catalyst which facilitates oxidation of methanol as well as reduction of oxygen. Thus, the crossed-over methanol is oxidized, and accordingly, performance of the DMFC considerably decreases.

In order to overcome methanol cross-over, efforts to develop a proton conductive electrolyte membrane capable of preventing methanol permeation and a cathode catalyst having low reactivity with methanol have been made. Further, the cathode catalyst layer needs to have capability of transferring oxygen and effectively removing water.

To improve oxygen adsorbing capability, pores in the cathode catalyst layer should be small and overall porosity of the cathode catalyst layer should be increased. However, when the pore size is too small, water is not easily removed in the catalyst layer. On the other hand, when the pore size is too large, overall porosity decreases, and thus oxygen adsorbing capability decreases even though water is easily removed. Therefore, pore size and porosity are required to transfer oxygen and effectively remove water.

To prepare a cathode catalyst layer having such properties, Japanese Patent Publication No. 2006-147371 discloses a method of preparing a catalyst layer having two types of pore sizes by simultaneously sputtering Pt and Fe particles and then removing Fe using hydrochloric acid.

Conventionally, an electrolyte catalyst for a high output fuel cell has been developed by feeding reactant gases and effectively discharging produced water by preparing a catalyst layer having various pore sizes.

SUMMARY OF THE INVENTION

Aspects of the present invention provide a membrane electrode assembly for a fuel cell having improved efficiency by effectively transferring oxygen and removing water and a method of manufacturing the same in order to solve the above-mentioned and/or other problems.

According to an aspect of the present invention, there is provided a membrane electrode assembly for a fuel cell comprising an electrode having a catalyst layer adjacent to a surface of an electrolyte membrane, wherein the catalyst layer is a porous catalyst layer having a mean pore diameter of 3 to 5 nm, and a porosity of 40 to 80%

According to another aspect of the present invention, there is provided a method of manufacturing a membrane electrode assembly for a fuel cell, the membrane electrode assembly comprising an electrode having porous catalyst layer adjacent to a surface of an electrolyte membrane, the method including: preparing an inorganic salt solution by dissolving an inorganic salt in water; preparing a catalyst layer slurry by mixing the inorganic salt solution, a metal catalyst, an ionomer, and a first solvent; preparing a transfer film for forming a catalyst layer by forming an electrode catalyst layer on a support membrane by coating the catalyst layer slurry on the support membrane to form the transfer film, and drying the coated support membrane; preparing a catalyst coated membrane (CCM) using a decal transfer method including transferring the catalyst layer formed on the support membrane of the transfer film to an electrolyte membrane, and detaching and separating the support membrane from the catalyst layer transferred to the electrolyte membrane; and forming a porous catalyst layer by treating the CCM with a second solvent.

According to another aspect of the present invention, there is provided a method of manufacturing a membrane electrode assembly for a fuel cell comprising an electrode having a porous catalyst layer adjacent to a surface of an electrolyte membrane, the method including: preparing an inorganic salt solution by dissolving an inorganic salt in water; preparing a catalyst layer slurry by mixing the inorganic salt solution, a metal catalyst, an ionomer, and a first solvent; forming a catalyst layer on the electrolyte membrane by directly coating the catalyst layer slurry on the electrolyte membrane, and drying the coated electrolyte membrane; and forming a porous catalyst layer by treating the catalyst layer formed on the electrolyte membrane with a second solvent Additional aspects and/or advantages of the invention will be set forth in part in the description which follows and, in part, will be obvious from the description, or may be learned by practice of the invention.

BRIEF DESCRIPTION OF THE DRAWINGS

The above and other features and advantages of the aspects of the present invention will become more apparent by describing in detail exemplary embodiments thereof with reference to the attached drawings in which.

DETAILED DESCRIPTION OF THE EMBODIMENTS

Figure 1:
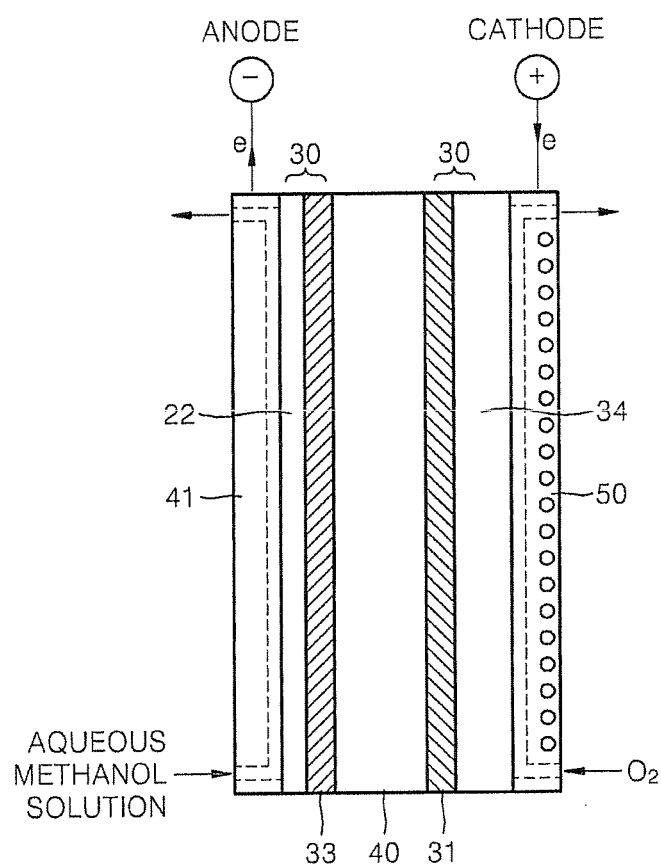
FIG. 1 shows a membrane electrode assembly according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the aspects of the present invention by referring to the figures.

FIG. 1 shows a membrane electrode assembly according to an embodiment of the present invention. As shown in FIG. 1, a direct methanol fuel cells (DMFC) includes an anode 32 to which a fuel is fed, a cathode 30 to which an oxidizer is fed, and an electrolyte membrane 40 disposed between the anode 32 and the cathode 30. Typically, the anode 32 includes an anode diffusion layer 22 and an anode catalyst layer 33, and the cathode 30 includes a cathode diffusion layer 34 and a cathode catalyst layer 31.

A separation plate 41 (or backing layer 41) includes channels to feed a fuel to the anode 32, and conducts electrons generated in the anode 32 to external circuits or adjacent unit cells. A separation plate 50 (or backing layer 50) includes channels to feed an oxidizer to the cathode 30, and conducts electrons fed from external circuits or adjacent unit cells to the cathode 30. Typically, an aqueous methanol solution is used as the fuel fed to the anode 32, and air is used as the oxidizer in the DMFC.

The aqueous methanol solution transferred to the anode catalyst layer 33 through the anode diffusion layer 22 is split into electrons, protons, carbon dioxides, and the like. The protons migrate to the cathode catalyst layer 31 through the electrolyte membrane 40, the electrons migrate to the cathode 30 through external circuits, and the carbon dioxides are discharged. At the cathode catalyst layer 31, the protons fed through the electrolyte membrane 40, the electrons fed from the anode 32 through the external circuits, and oxygen in the air fed through the cathode diffusion layer 34 react to produce water.

In the DMFC, the electrolyte membrane 40 conducts protons, prevents conduction of electrons, separates the electrodes, and the like. The electrolyte membrane 40 prevents unreacted fuels from being transferred to the cathode 30 and/or prevents unreacted oxidizer from being transferred to the anode 32.

The DMFC electrolyte membrane includes a proton polymer electrolyte, such as a sulfonated perfluorinated polymer with fluorinated alkylene in the backbone and fluorinated vinylether side chains with sulfonic acid at its terminal, such as NAFION®, manufactured by E. I. du Pont de Nemours and Company.

Aspects of the present invention provide a membrane electrode assembly for a fuel cell including an electrode having electrode catalyst layers adjacent to one or both surfaces of an electrolyte membrane, and the pore size and porosity of the electrode catalyst layer improve oxygen transferring capability and effectively remove water. A mean pore diameter of the porous electrode catalyst layer may be 3 to 5 nm, and the porosity may be 40 to 80%. The electrode catalyst layer according to an embodiment of the present invention has excellent oxygen transferring capability and effective water removing capability. When the mean pore diameter is less than 3 nm, water is not smoothly discharged even though oxygen is efficiently diffused because of high porosity, thereby decreasing cell performance. On the other hand, when the mean pore diameter is greater than 5 nm, oxygen is too slowly diffused even though water is easily discharged because of low porosity, thereby decreasing cell performance.

When porosity of the electrode catalyst layer is less than 40%, fuel supply and discharge are not easily performed. On the other hand, when the porosity of the electrode catalyst layer is higher than 80%, the distance between the catalyst and ionomer may be increased, and thus reaction transfer resistance may be increased, thereby reducing proton ionic transfer capability.

Further, the specific surface area of the electrode catalyst layer may be 6 to 10 $m^2/g$. When the specific surface area of the electrode catalyst layer is less than 6 $m^2/g$, fuel supply and discharge are not easily performed even though interface resistance and electrical resistance of the electrode catalyst layer decrease. On the other hand, when the specific surface area is greater than 10 $m^2/g$, ion transfer capability is decreased and the interface resistance and electrical resistance are too high although fuel supply and discharge are easily performed. Here, the mean pore diameter and specific surface area of the electrode catalyst layer are measured using a B.E.T. method. The porosity is a ratio of volume of pores to the total volume of the electrode catalyst layer, and measured using a Porositimeter.

Further, the thickness of the porous electrode catalyst layer may be 10 to 40 μm and the loading amount of the catalyst may be 4 to 6 $mg/cm^2$. When the thickness of the porous electrode catalyst layer is less than 10 μm and the loading amount of the catalyst is less than 4 $mg/cm^2$, methanol crossover occurs since fuel is easily permeated through the catalyst layer although electrical resistance decreases. On the other hand, when the thickness of the porous electrode catalyst layer is greater than 40 μm and the loading amount of the catalyst is greater than 6 $mg/cm^2$, reaction efficiency of the catalyst layer decreases since the fuel feeding time in the entire catalyst layer increases.

The membrane electrode assembly according to aspects of the present invention includes an electrode having a porous catalyst layer adjacent to a surface of the electrolyte membrane. Further, the membrane electrode assembly may include electrodes disposed on each side of the electrolyte membrane, each electrode having a porous catalyst layer disposed adjacent to the respective side of the electrolyte membrane. Processes of manufacturing the membrane electrode assembly will now be described with reference to FIGS. 2A to 2B.

Figure 2A:
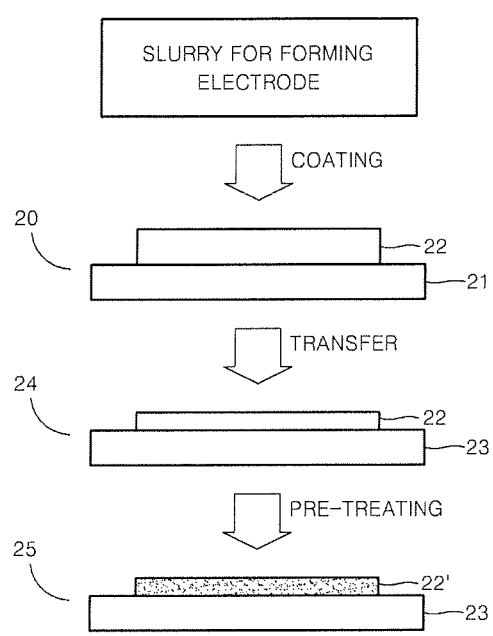
FIG. 2A schematically shows a process of a decal transfer method of transferring a catalyst layer to an electrolyte membrane according to an embodiment of the present invention.
Figure 2B:
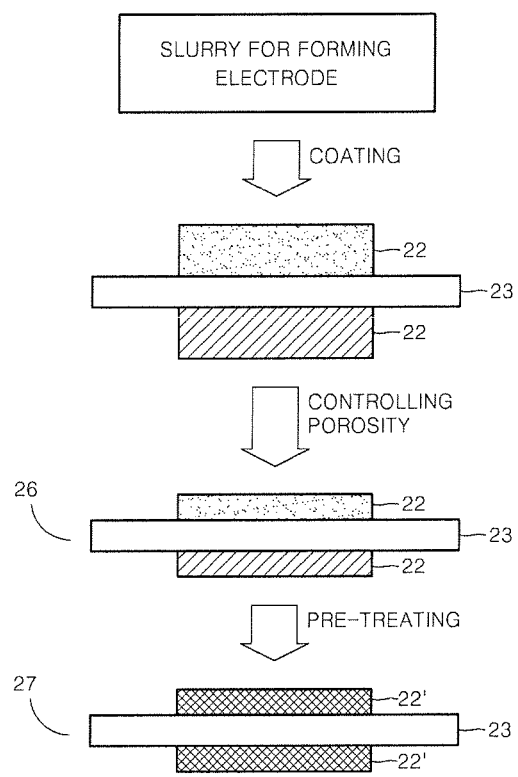
FIG. 2B schematically shows a process of a direct coating method of forming a catalyst layer on an electrolyte membrane according to an embodiment of the present invention.

FIG. 2A schematically shows a process of a decal transfer method to form an electrode catalyst layer by preparing a transfer film for an electrode catalyst layer and transferring the film to an electrolyte membrane according to an embodiment of the present invention. FIG. 2B schematically shows a process of a direct coating method to form an electrode catalyst layer on an electrolyte membrane by directly coating a catalyst layer slurry on the electrode according to an embodiment of the present invention.

Figure 2C:
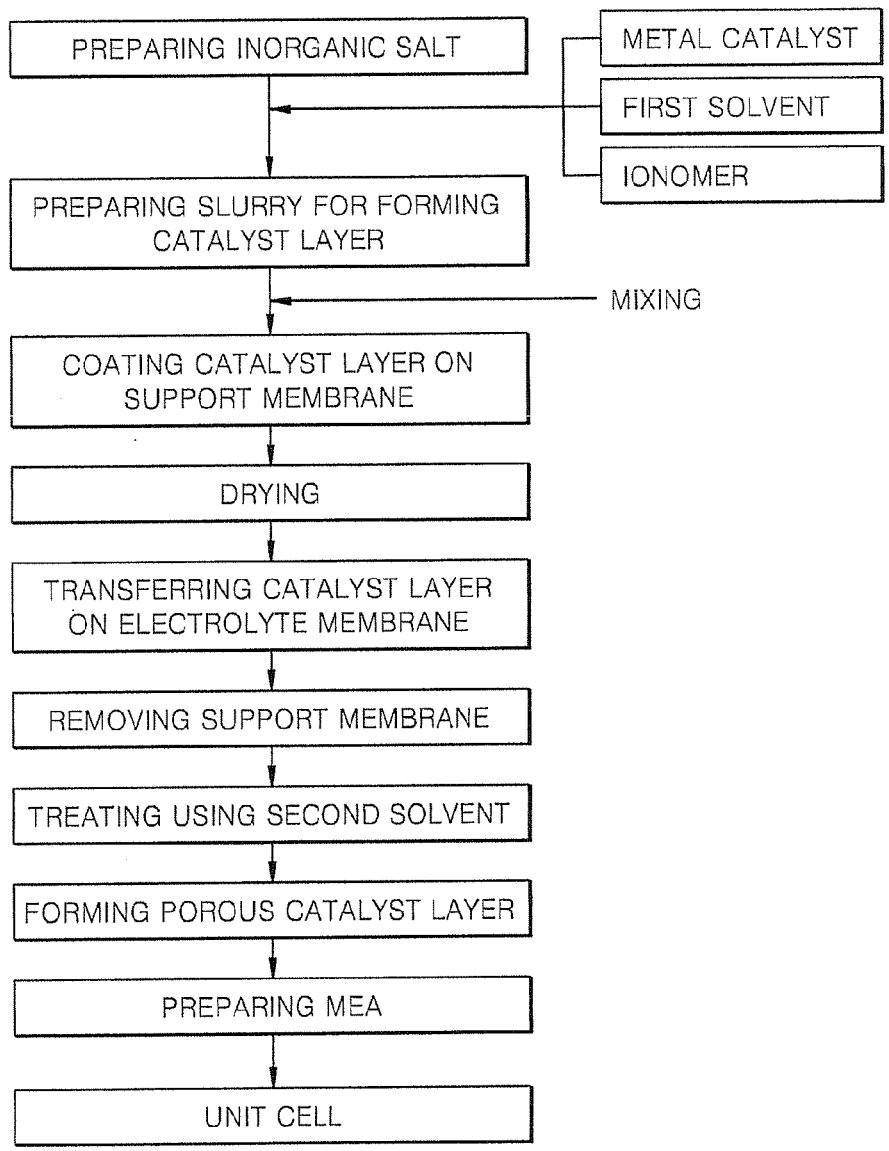
FIG. 2C shows a flow diagram of a process of manufacturing a catalyst layer using a decal transfer method according to an embodiment of the present invention.
Figure 2D:
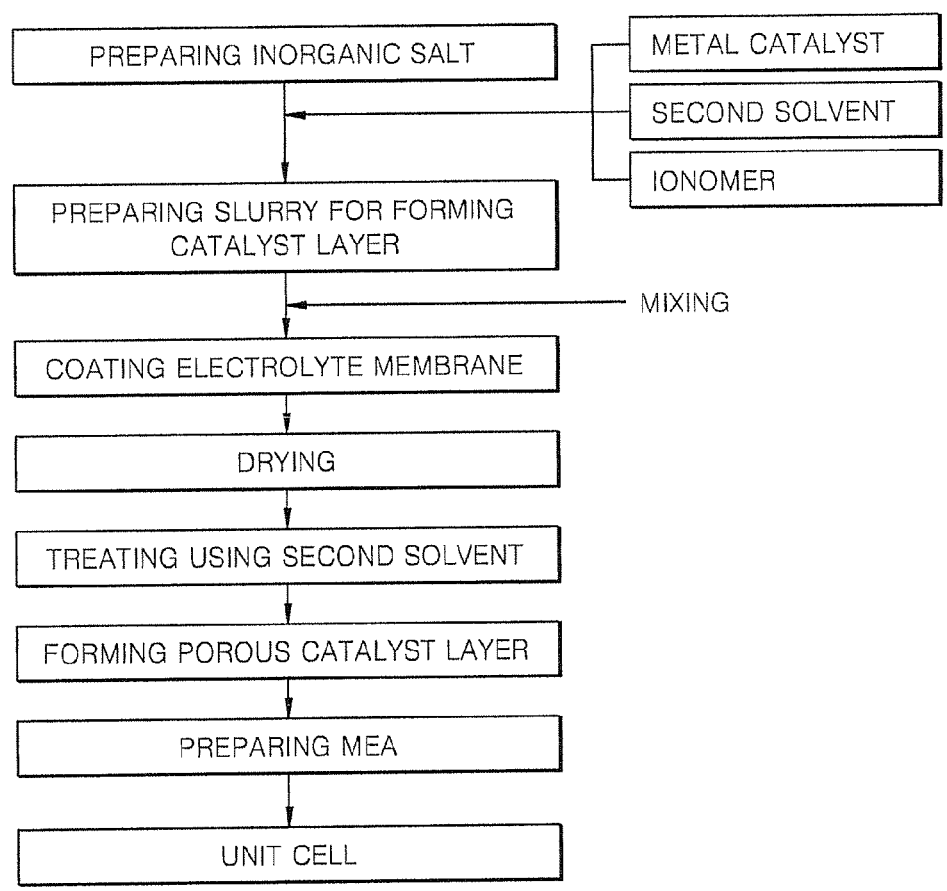
FIG. 2D shows a flow diagram of a process of manufacturing a catalyst layer using a direct coating method according to an embodiment of the present invention.

FIG. 2C shows a flow diagram of a process of manufacturing a catalyst coated membrane (CCM) and a membrane electrode assembly (MEA) for a direct methanol fuel cell using a decal transfer method according to an embodiment of the present invention. FIG. 2D shows a flow diagram of a process of manufacturing a CCM and an MEA for a direct methanol fuel cell using a direct coating method of forming an electrode catalyst layer by directly coating a catalyst layer slurry on an electrode according to an embodiment of the present invention A process of manufacturing an MEA according to aspects of the present invention will be described in more detail with reference to FIGS. 2A to 2D.

With regard to FIGS. 2A and 2C, an inorganic salt solution is prepared by dissolving an inorganic salt. The inorganic salt solution is mixed with a metal catalyst, an ionomer, and a first solvent to prepare a catalyst layer slurry. A transfer film 20 is prepared by forming an electrode catalyst layer 22 on a support membrane 21 by coating the catalyst layer slurry on the support membrane 21 and drying the coated support membrane 21. The support membrane 21 may be polyethylene (PE) film, mylar film, polyethylene terephthalate film, Teflon film, polyimide film (Kepton film), polytetrafluoroethylene film, or the like. The method of coating the catalyst layer slurry may include bar coating, spraying, screen printing, and the like, but are not limited thereto.

The electrode catalyst layer 22 formed on the support membrane 21 of the transfer film 20 is transferred to the electrolyte membrane 23, and the support membrane 21 is detached and separated from the electron catalyst layer 22 transferred to the electrolyte membrane 23 to form the CCM 24.

Then, the CCM 24 is treated with a second solvent to dissolve the inorganic salt and remove the inorganic salt, and thus a porous catalyst layer 22 is formed on the electrolyte membrane 23.

The treatment of the CCM 24 is performed by refluxing the CCM 24 at a temperature of 80 to 100° C. for 2 to 5 hours. The second solvent may be a mixture of an acidic solvent and an alcohol. The concentration of each of the acidic solvent solution and the alcohol solution may be 0.5 to 2 M, and the molarity ratio between the acidic solvent and the alcohol solution is 3:0.5 to 1:1.5 in the mixture. The acidic solvent may be sulfuric acid, nitric acid, hydrochloric acid, nonvolatile organic acid, or the like. The alcohol may be methanol, ethanol, propanol, or the like, and the acidic solvent and the alcohol may be used in an aqueous solution state.

The inorganic salt in the catalyst layer slurry may be magnesium chloride, magnesium sulfate, magnesium nitrate, calcium chloride, calcium sulfate, calcium nitrate, or the like, which is prepared by dissolving at least one inorganic salt selected from the group consisting of salts consisting of a Group II element, and $Cl^-$, $SO_4^{2-}$, or $NO_3^-$. The Group II element may be Mg or Ca but is not limited thereto. The amount of the inorganic salt may be 10 to 30 parts by weights based on 100 parts by weight of the metal catalyst of the catalyst layer slurry. When the amount of the inorganic salt is less than 10 parts by weight, the amount of the inorganic salt which forms pores in the catalyst layer is too low to make a porous catalyst layer. On the other hand, when the amount of the inorganic salt is greater than 30 parts by weight, too many pores are formed, and thus the resultant catalyst layer may collapse. The amount of water dissolving the inorganic salt may be 250 to 300 parts by weight based on 100 parts by weight of the inorganic salt.

Any catalyst that is commonly used in fuel cells, such as Pt or a Pt alloy (PtRu, etc.), may be used as the metal catalyst, or any supported catalyst in which the metal catalyst is loaded on a support may be used. Examples of the supported catalyst may include carbon powder, activated carbon powder, graphite powder, and carbon molecular sieve. Examples of the activated carbon powder may include VULCAN® XC-72 from Cabot Corporation and KETJENBLACK® from Akzo Nobel Chemicals B.V. Corporation.

The first solvent in the catalyst layer slurry may be water, ethylene glycol, isopropyl alcohol, polyalcohol, etc. The amount of the first solvent may be 250 to 300 parts by weight based on 100 parts by weight of the metal catalyst.

A representative example of the ionomer is a sulfonated perfluorinated polymer with fluorinated alkylene in the backbone and fluorinated vinylether side chains with sulfonic acid at its terminal, such as NAFION®, manufactured by E. I. du Pont de Nemours and Company, and any polymers that have similar properties may be used as the ionomer. The ionomer is dispersed in a solvent of water and alcohol, and the amount of the ionomer may be 7.5 to 12.5 parts by weight based on 100 parts by weight of the metal catalyst.

A diffusion layer and a backing layer of the cathode are stacked on one surface of the treated CCM 25, and a diffusion layer and a backing layer of the anode are stacked on the other surface of the treated CCM 25, and the treated CCM 25 is hot-pressed.

When an MEA is prepared using a decal transfer method transferring a catalyst layer to an electrolyte membrane, the hot-pressing of the treated CCM 25 may be performed at a temperature of 100 to 160° C. at a pressure of 0.2 to 0.8 ton$_f$/cm$^2$ for 1 to 20 minutes, preferably at a temperature of 120 to 140° C. at a pressure of 0.4 to 0.6 ton$_f$/cm$^2$ for 5 to 15 minutes, and more preferably at 130° C. at a pressure of 0.5 ton$_f$/cm$^2$ for 10 minutes.

The resultant porous catalyst layer may be used in one of the cathode and the anode, or both of the cathode and the anode.

With reference to FIGS. 2B and 2D, as described in the method of FIG. 2C, an inorganic salt is dissolved in water to prepare an inorganic salt solution, and the inorganic salt solution is mixed with a metal catalyst, an ionomer, and a first solvent to prepare a catalyst layer slurry. Here, the type and amount of the inorganic salt and the composition of the catalyst layer slurry are the same as described above with reference to FIG. 2C.

Then, the catalyst layer slurry is coated on the electrolyte membrane 23, and the coated resultant is dried to form an electrode catalyst layer 22 on the electrolyte membrane 23 to form a catalyst coated membrane (CCM) 26. As shown, the catalyst layer slurry may be coated on both sides of the electrolyte membrane 23 to form electrode catalysts layers 22 on both sides thereof; however, aspects of the present invention are not limited thereto such that the catalyst layer slurry may be coated on only one side of the electrolyte membrane 23. Further, the catalyst layer slurry and the resultant electrolyte membranes 23 may have different compositions. The coated resultant (the CCM 26) is dried at a temperature of 100 to 125° C. for 12 to 24 hours, although the drying time may vary depending on the drying temperature. The coating method of the catalyst layer slurry may be bar coating, screen printing, or the like, but is not limited thereto.

Then, the electrode catalyst layers 22 formed on the electrolyte membrane 23 are treated with a second solvent as in the method of FIG. 2C to form porous catalyst layers 22 on the electrolyte membrane 23 or treated CCM 27.

According to the manufacturing processes, a membrane electrode assembly including an electrode having a porous electrode catalyst layer according to aspects of the present invention may be prepared.

When an MEA is prepared using a direct coating method directly coating an electrolyte catalyst layer on an electrolyte membrane, the hot-pressing the CCM may be performed at a temperature of 100 to 160° C. at a pressure of 0.01 to 0.4 ton$_f$/cm$^2$ for 1 to 20 minutes, preferably at a temperature of 120 to 140° C. at a pressure of 0.1 to 0.3 ton$_f$/cm$^2$ for 5 to 15 minutes, and more preferably at 130° C. at a pressure of 0.2 ton$_f$/cm$^2$ for 10 minutes.

In particular, when an MEA is prepared using the decal transfer method transferring a catalyst layer to an electrolyte membrane, porosity of the catalyst layer is low since pressure applied to the electrolyte membrane and the catalyst layer is high so as to raise interface adhesion of the electrolyte membrane and the catalyst layer. On the other hand, when an MEA is prepared using the direct coating method directly coating an electrode catalyst layer on an electrolyte membrane, porosity of the catalyst layer may be controlled due to low interface resistance between the electrolyte membrane and the catalyst layer since the catalyst layer is directly formed on the electrolyte membrane, and thus the MEA can have increased performance.

Aspects of the present invention provide a fuel cell employing the membrane electrode assembly. The fuel cell may be a DMFC. Hereinafter, the aspects of present invention will be described in more detail with reference to examples. The following examples are for illustrative purposes and are not intended to limit the scope of the aspects of the present invention.

EXAMPLE 1

Using a Decal Transfer Method to Transfer a Catalyst Layer to an Electrolyte Membrane 0.4 g MgSO$_4$ (20 parts by weight based on 100 parts by weight of a catalyst) and 1 g of water were added to a 20 ml reactor to completely dissolve the MgSO$_4$, and then 2 g of Pt-black was added thereto. 1.25 g of 20 wt % NAFION® solution and 3 g of ethylene glycol (EG) were added to the reactor, and mixed using a high-speed mixer (from Thinky Corp.) for 3 minutes to prepare a cathode catalyst layer slurry. This mixing was performed three times to obtain uniform state of the cathode catalyst layer slurry.

Polytetrafluoroethylene (PTFE) film was used as a support membrane for a transfer film and was placed on bar-coater equipment on a flat glass plate, and then a predetermined region on the PTFE film was covered with polyethylene film having a thickness of 110 μm as a mask for patterning the cathode catalyst layer. The cathode catalyst layer slurry prepared above was poured on the resultant obtained above in two steps, and then the bar-coater was slowly moved to prepare a uniform cathode catalyst layer on the support membrane for the transfer film on which the mask was covered. The prepared resultant was dried in a vacuum oven at 120° C. for 24 hours to prepare a transfer film for the cathode catalyst layer.

Separately, a transfer film for forming an anode catalyst layer was prepared according to the following process: 2 g of PtRu-black, 1.25 g of 20 wt % NAFION® solution, and 3 g of ethylene glycol (EG) were added to a 20 ml reactor, and mixed using a high-speed mixer (from Thinky Corp.) for 3 minutes to prepare an anode catalyst layer slurry for an anode. This mixing was performed three times to obtain uniform state of the anode catalyst layer slurry. The loading amount of the anode catalyst was adjusted to 5 to 6 mg/cm$^2$.

Polytetrafluoroethylene (PTFE) film was used as a support membrane for a transfer film and was placed on a flat glass plate, and then a predetermined region on the PTFE film was covered with polyethylene film having a thickness of 110 μm as a mask for patterning the anode catalyst layer. The anode catalyst layer slurry prepared above was poured on the resultant obtained above in two steps, and then the bar-coater was slowly moved to prepare a uniform anode catalyst layer on the support membrane for the transfer film on which the mask was covered. The prepared resultant was dried in a vacuum oven at 120° C. for 24 hours to prepare a transfer film for forming the anode catalyst layer.

The transfer films for forming the anode catalyst layer and the cathode catalyst layer obtained above were placed on both sides of an electrolyte membrane, and then the anode catalyst layer and the cathode catalyst layer were transferred to the electrolyte membrane at 130° C. at 0.5 ton$_f$/cm$^2$ for 10 minutes. Then, the polyethylene film support membrane was detached from the cathode catalyst layer and the anode catalyst layer and then separated.

Then, the resultant was refluxed at 95° C. for 4 hours using a mixture of 500 g of 1M sulfuric acid solution and 500 g of 1M aqueous methanol solution to treat the CCM. The treated CCM was dried using a Gel-dryer. Then, a diffusion layer and a backing layer of the cathode and a diffusion layer and a backing layer of the anode were respectively applied to the upper surface of the cathode catalyst layer and the anode catalyst layer of the resultant, and the CCM was hot-pressed to prepare an MEA.

EXAMPLE 2

Using a Decal Transfer Method to Transfer a Catalyst Layer to an Electrolyte Membrane An MEA was prepared in the same manner as in Example 1 except that 0.3 g of $MgSO_4$ (15 parts by weight based on 100 parts by weight of the catalyst) and 1 g water were added to completely dissolve $MgSO_4$.

EXAMPLE 3

Using a Direct Coating Method to Directly Coat a Catalyst Layer on an Electrolyte Membrane After preparing a cathode catalyst layer slurry identical to that of Example 1, a NAFION®-115 film (E. I. du Pont de Nemours and Company) was placed on a vacuum plate of a bar-coater equipment having a vacuum device, and then a predetermined region on the membrane was covered with polyethylene film having a thickness of 110 μm as a mask to pattern a cathode catalyst layer.

The cathode catalyst layer slurry prepared above was poured on the resultant obtained above in two steps, and then the bar-coater was slowly moved to prepare a uniform cathode catalyst layer on the electrolyte membrane on which the mask was covered. The prepared resultant was dried in a vacuum oven at 120° C. for 24 hours to directly coat the cathode catalyst layer on the electrolyte membrane.

After the coating of the cathode catalyst layer, an anode catalyst layer slurry to form an anode identical to that of Example 1 was prepared and directly coated and dried on the electrolyte membrane in the same manner described above. Although the cathode catalyst layer was described as being formed before the anode catalyst layer, aspects of the present invention are not limited thereto such that either of the catalyst layers may be formed before the other or the catalyst layers may be formed simultaneously.

PTFE films were applied to both surfaces of the CCM prepared according to the above described process and the CCM was hot-pressed at 120° C. at 0.1 ton/cm² for 10 minutes, and then the PTFE films were removed. Then, an MEA was prepared in the same manner in Example 1.

EXAMPLES 4 TO 11

Using a Direct Coating Method to Directly Coat a Catalyst Layer on an Electrolyte Membrane An MEA was prepared in the same manner as in Example 3, except the conditions for the CCM hot-press shown in Table 1 were applied thereto.

COMPARATIVE EXAMPLE 1

An MEA was prepared in the same manner as in Example 1, except that $MgSO_4$ was not included to form the cathode catalyst layer.

TABLE 1

| | CCM preparation | $MgSO_4$ g/catalyst g | Hot-pressing conditions | | Power density (mW/cm²) (0.35 V, 50° C.) |
| --- | --- | --- | --- | --- | --- |
| | | | Temperature (° C.) | Pressure (Ton/cm²) | |
| Comparative Example 1 | Decal transfer method | 0 | 130 | 0.5 | 62.2 |
| Example 1 | | 0.2 | 130 | 0.5 | 67.5 |
| Example 2 | | 0.15 | 130 | 0.5 | 65.3 |
| Example 3 | Direct coating method | 0.2 | 120 | 0.1 | 96.5 |
| Example 4 | | 0.2 | 120 | 0.2 | 92.9 |
| Example 5 | | 0.2 | 120 | 0.3 | 80.7 |
| Example 6 | | 0.2 | 130 | 0.1 | 83.4 |
| Example 7 | | 0.2 | 130 | 0.2 | 95.6 |
| Example 8 | | 0.2 | 130 | 0.3 | 66.3 |
| Example 9 | | 0.2 | 140 | 0.1 | 86.6 |
| Example 10 | | 0.2 | 140 | 0.2 | 62.3 |
| Example 11 | | 0.2 | 140 | 0.3 | 82.5 |

Referring to Table 1, the MEAs of Examples 1 and 2 prepared using the decal transfer method had improved power density compared to the MEA of Comparative Example 1. In addition, the MEAs of Examples 3 to 11 prepared using the direct coating method had higher power density although the hot-pressing was performed at a lower pressure compared to the MEAs of Examples 1 and 2. In particular, the MEAs had greatest performance at 130° C. at 0.2 ton/cm². The MEAs of Examples 3 to 11 outperformed the MEAs of Examples 1 and 2 as oxygen supply and water discharge were facilitated due to high porosity because the thickness of the catalyst layer formed by the direct coating method was about three times or greater than the thickness of the catalyst layer formed by the decal transfer method.

TABLE 2

| Sample | Specific surface area (m²/g)[a] | Porosity (%)[b] | Mean pore diameter (nm) |
|---|---|---|---|
| Example 1 | 8.25 | 46.5 | 3 |
| Example 2 | 6.75 | 40.12 | 3 |
| Example 3 | 9.15 | 77.14 | 3 |
| Example 7 | 9.03 | 77.01 | 3 |
| Comparative Example 1 | 4.95 | 26.1 | N/A |

NOTE:
[a]measurement of the BET method,
[b]measurement of the porositimeter.

Figure 3:
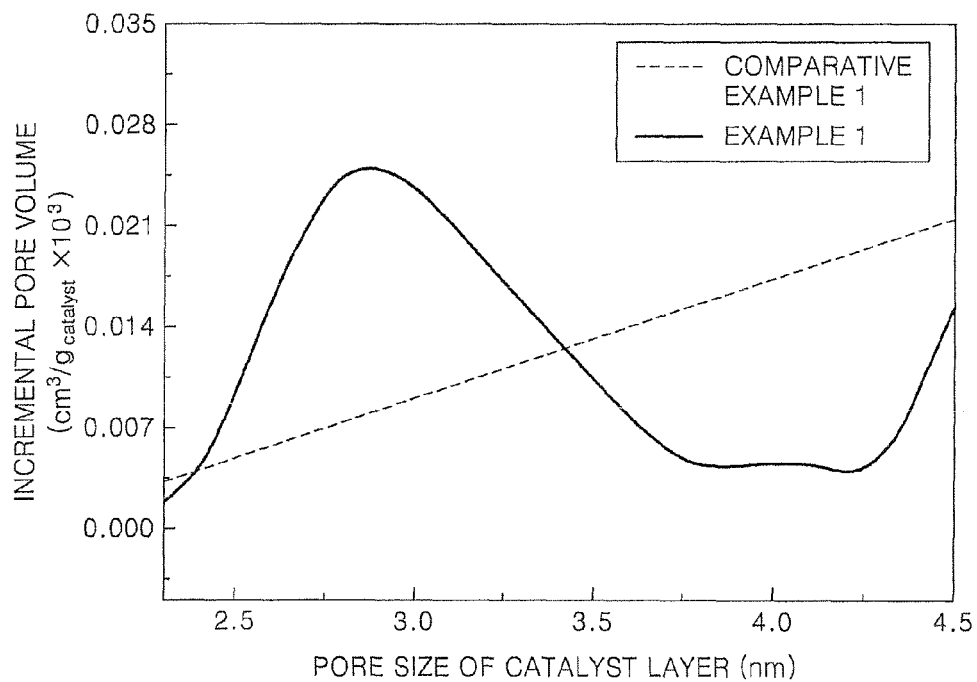
FIG. 3 is a graph illustrating pore distribution and specific surface area of a catalyst layer prepared by a decal transfer method according to an embodiment of the present invention.

As shown in Table 2, porosity of Examples 1 and 2 in which pores were formed in the catalyst layer since $MgSO_4$ was added was improved by 54 to 78% compared to porosity (26.1%) of Comparative Example 1 in which $MgSO_4$ was not used. Such results were obtained since the pores having a mean diameter of 3 nm were uniformly formed because of the $MgSO_4$ in Examples 1, 2, 3 and 7. Meanwhile, the mean pore diameters were widely distributed in Comparative Example 1 in which a pore forming agent was not used. Further, FIG. 3 is a graph illustrating pore distribution and specific surface area of a catalyst layer prepared according to Example 1 formed by a decal transfer method according to an embodiment of the present invention compared to the Comparative Example 1. The catalyst layer prepared according to Example 1 exhibits a controlled pore size whereas the Comparative Example 1 does not.

In addition, porosity of the catalyst layer formed using the direct coating method (Example 3) was increased by 70% or more compared to porosity of the catalyst layer formed using the decal transfer method (Examples 1 and 2) when the loading amount of the catalyst is the same. Those results were obtained as the interface resistance can be decreased and porosity can be increased by the direct coating method. As such, the direct coating method can increase performances of the resultant MEAs.

Figure 4A:
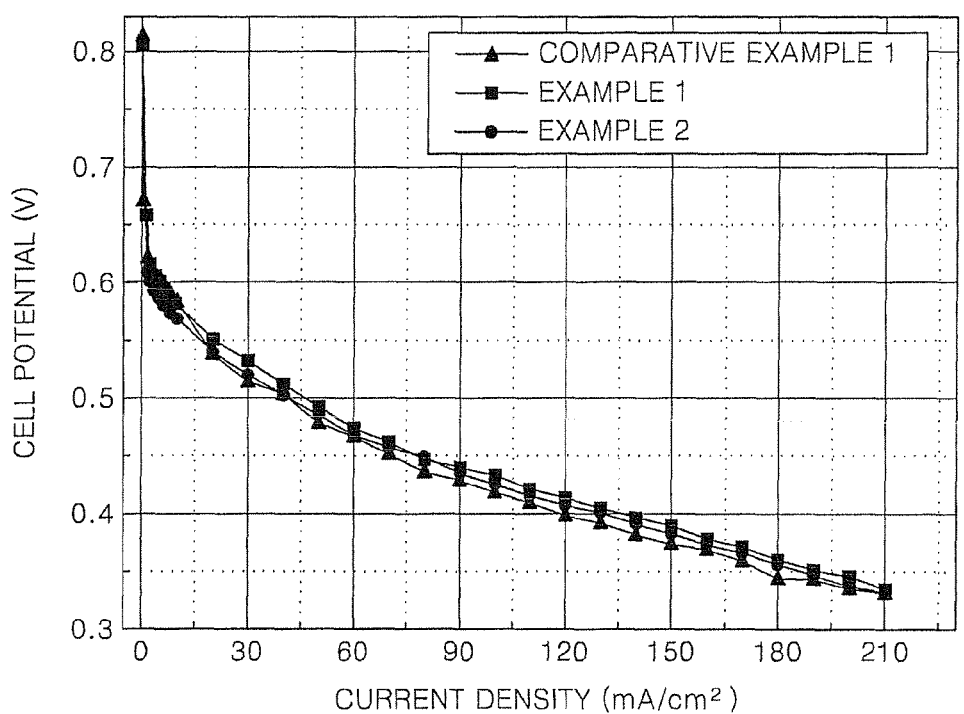
FIGS. 4A and 4B are graphs illustrating voltage with respect to current density and power density with respect to time in a fuel cell employing a cathode catalyst layer manufactured according to Examples 1 and 2 and Comparative Example 1.
Figure 4B:
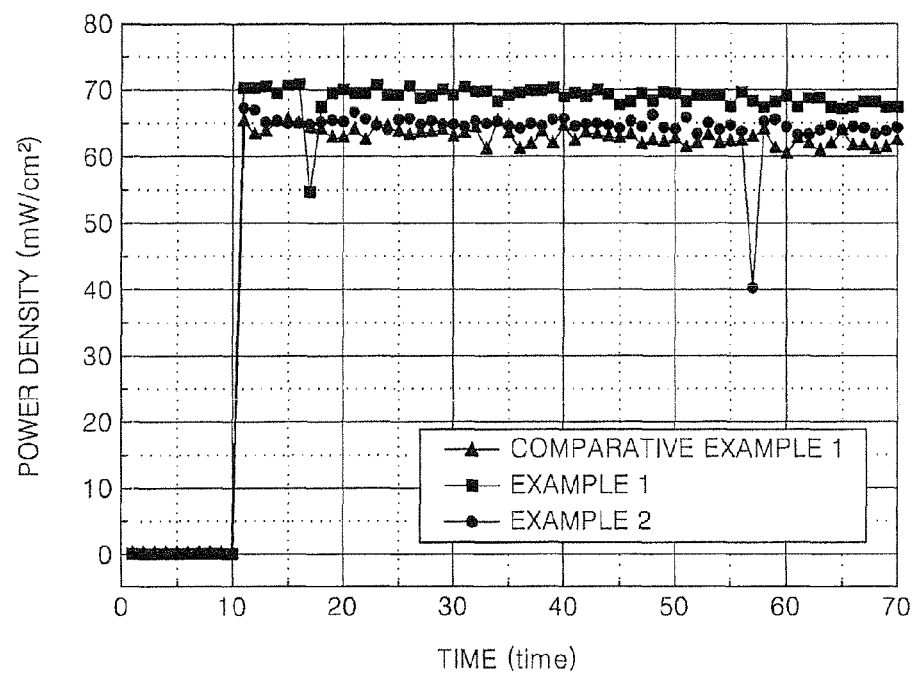

The prepared MEAs were electrochemically analyzed while 1 M methanol was supplied to the anode at 0.3 mL/min·A and air was supplied to the cathode at 52.5 mL/min·A at 50° C. at a driving voltage of 0.35 V, and the results are shown in FIGS. 4A and 4B and Table 3. As shown in FIG. 4A, the Examples 1 and 2 exhibited an increased cell potential with respect to current density as compared to the Comparative Example 1.

TABLE 3

| Sample | Loading amount of catalyst (mg/cm²) | Thickness of catalyst layer (μm) | Power density (mW/cm²) 0.35 V, 50° C. |
|---|---|---|---|
| Comparative Example 1 | 5.23 | 12 | 62.2 |
| Example 1 | 5.12 | 15 | 67.5 |
| Example 2 | 5.10 | 15 | 64.3 |
| Example 3 | 5.14 | 35 | 96.5 |
| Example 7 | 5.11 | 33 | 95.6 |

As shown in FIG. 4B and Table 3, each of the MEAs of Examples 1 and 2 using $MgSO_4$ as a pore forming agent respectively had performance of 67.5 mW/cm² and 64.3 mW/cm² using a loading amount of the cathode catalyst similar to that of Comparative Example 1. However, performance of the MEA of Comparative Example 1 in which a pore forming agent was not used was only 62.2 mW/cm². Accordingly, reduction of oxygen can be facilitated and water can be easily discharged by forming pores in the cathode catalyst layer using $MgSO_4$ as a pore forming agent.

In addition, the MEAs of Examples 3 and 7 having increased porosity and prepared using the direct coating method had improved performance due to high reaction efficiency obtained by reducing interface resistance and facilitating fuel supply and discharge compared to those of Examples 1 and 2 prepared using the decal transfer method.

Figure 5A:
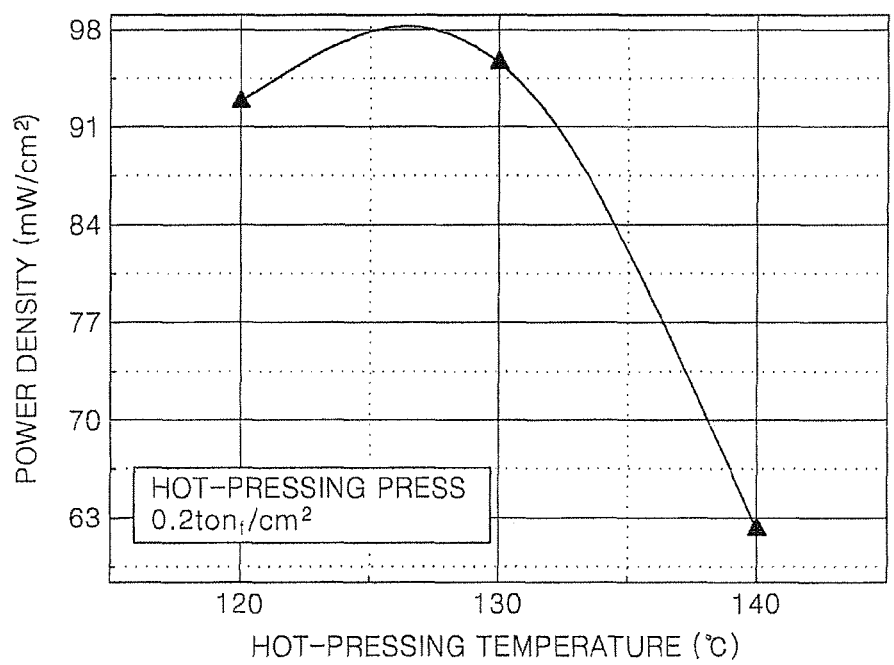
FIGS. 5A and 5B are graphs illustrating power densities of fuel cells with respect to hot-press temperature and hot-press pressure according to Examples 3 to 11 formed by a direct coating method directly coating a catalyst layer on an electrolyte membrane.
Figure 5B:
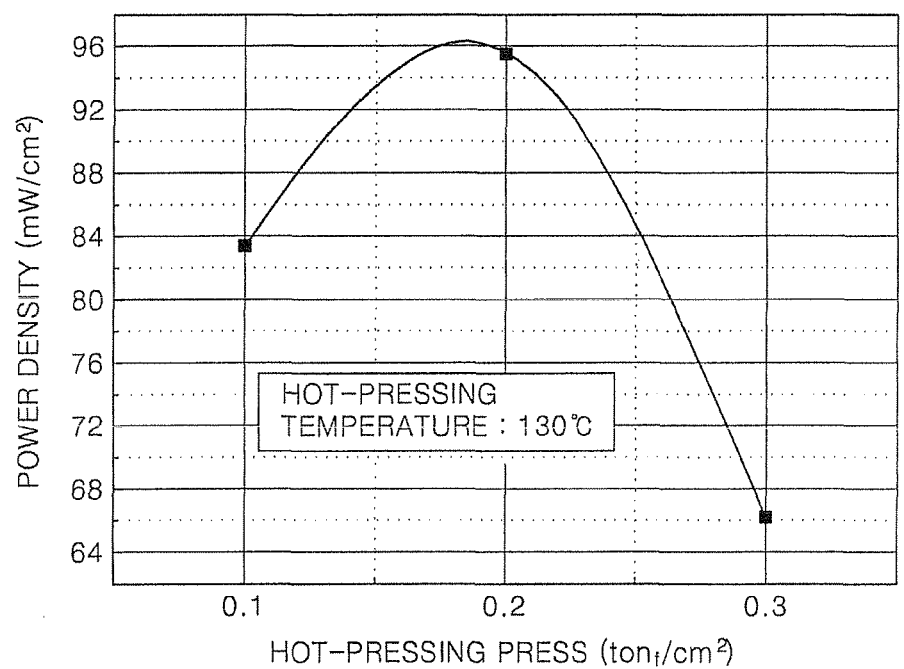

FIGS. 5A and 5B are graphs illustrating power densities with respect to hot-press temperature and hot-press pressure according to Examples 3 to 11 formed by a direct coating method directly coating a catalyst layer on an electrolyte membrane. In FIG. 5A, the power density peaked at a hot-press temperature of about 123° C. under a hot-press pressure of 0.2 ton/cm². Further, in FIG. 5B, the power density peaked at a hot-press pressure of about 0.18 ton/cm² at a hot-press temperature of 130° C.

According to aspects of the present invention, the porous electrode catalyst layer can improve reduction of oxygen, facilitate discharging water which is a by-product, decrease manufacturing costs by reducing the amount of noble metal catalyst, and improve efficiency of fuel cells by stabilizing reaction efficiency.

While aspects of the present invention have been particularly shown and described with reference to exemplary embodiments thereof, it will be understood by those of ordinary skill in the art that various changes in form and details may be made therein without departing from the spirit and scope of the aspects of the present invention as defined by the following claims and their equivalents.

What is claimed is:

1. A membrane electrode assembly for a fuel cell, the membrane electrode assembly comprising:
    an electrode having a catalyst layer adjacent to a surface of an electrolyte membrane,
    wherein:
    the catalyst layer is a porous catalyst layer including a plurality of pores having a mean pore diameter of 3 to 5 nm based on all pores, the pores being uniformly distributed in the porous catalyst layer, the porous catalyst layer having a porosity of 40 to 80%, and
    a specific surface area of the porous catalyst layer is 6.75 to 9.15 m²/g.

2. The membrane electrode assembly of claim 1, wherein the thickness of the porous catalyst layer is 10 to 40 μm, and a loading amount of the catalyst is 4 to 6 mg/cm².

3. A method of manufacturing a membrane electrode assembly for a fuel cell, the membrane electrode assembly comprising an electrode having a porous catalyst layer adjacent to a surface of an electrolyte membrane, the method comprising:
    preparing an inorganic salt solution by dissolving an inorganic salt in water;
    preparing a catalyst layer slurry by mixing the inorganic salt solution, a metal catalyst, an ionomer, and a first solvent;
    preparing a transfer film by coating the catalyst layer slurry on a support membrane to form the transfer film, and drying the coated support membrane;
    preparing a catalyst coated membrane (CCM) by transferring the catalyst layer formed on the support membrane of the transfer film to an electrolyte membrane, and detaching and separating the support membrane from the catalyst layer transferred to the electrolyte membrane; and
    forming the porous catalyst layer by treating the CCM with a second solvent, such that the catalyst layer includes a plurality of pores having a mean pore diameter of 3 to 5 nm based on all pores, the pores being uniformly distributed in the porous catalyst layer, a porosity of 40 to 80%, and a specific surface area of 6.75 to 9.15 m$^2$/g.

4. The method of claim 3, wherein the treating of the CCM comprises refluxing the CCM at a temperature of 80 to 100° C.

5. The method of claim 3, further comprising:
stacking a diffusion layer and a backing layer of the electrode on one surface of the treated CCM;
stacking a diffusion layer and a backing layer of another electrode on the other surface of the CCM; and
hot-pressing the CCM.

6. The method of claim 5, wherein the hot-pressing is performed at a temperature of 100 to 160° C. and at a pressure of 0.2 to 0.8 ton/cm$^2$.

7. The method of claim 3, wherein the inorganic salt is at least one selected from the group consisting of salts consisting of Group II elements of Mg or Ca and Cl$^-$, SO$_4^{2-}$ or NO$_3^-$.

8. The method of claim 3, wherein the amount of the inorganic salt is 10 to 30 parts by weight based on 100 parts by weight of the metal catalyst of the catalyst layer slurry.

9. The method of claim 3, wherein the second solvent is a mixture of an acidic solvent and an alcohol.

10. The method of claim 9, wherein the acidic solvent is at least one solvent selected from the group consisting of sulfuric acid, nitric acid, hydrochloric acid, and non-volatile organic acid, a combination thereof, or an aqueous solution thereof.

11. The method of claim 9, wherein a molarity ratio between the acidic solvent and the alcohol is 3:0.5 to 1:1.5.

12. The method of claim 3, wherein the porous catalyst layer is at least one of a cathode catalyst layer and an anode catalyst layer.

13. A method of manufacturing a membrane electrode assembly for a fuel cell, the membrane electrode assembly comprising an electrode having a porous catalyst layer adjacent to a surface of an electrolyte membrane, the method comprising:

preparing an inorganic salt solution by dissolving an inorganic salt in water;
preparing a catalyst layer slurry by mixing the inorganic salt solution, a metal catalyst, an ionomer, and a first solvent;
forming a catalyst coated membrane (CCM) by coating the catalyst layer slurry on at least one surface of the electrolyte membrane, and drying the coated electrolyte membrane; and
forming a porous catalyst layer by treating the CCM with a second solvent, such that the catalyst layer includes a plurality of pores having a mean pore diameter of 3 to 5 nm based on all pores, the pores being uniformly distributed in the porous catalyst layer, a porosity of 40 to 80%, and a specific surface area of 6.75 to 9.15 m$^2$/g.

14. The method of claim 13, wherein the treating of the CCM comprises refluxing the coated electrolyte membrane at a temperature of 80 to 100° C.

15. The method of claim 13, further comprising:
stacking a diffusion layer and a backing layer of the electrode on the at least one surface of the electrolyte membrane;
stacking a diffusion layer and a backing layer of another electrode on the other surface of the electrolyte membrane; and
hot-pressing the CCM.

16. The method of claim 15, wherein the hot-pressing is performed at a temperature of 100 to 160° C., and at a pressure of 0.01 to 0.4 ton/cm$^2$.

17. The method of claim 13, wherein the second solvent is a mixture of an acidic solvent and an alcohol.

18. The method of claim 17, wherein a molarity ratio between the acidic solvent and the alcohol is 3:0.5 to 1:1.5.

19. The method of claim 13, wherein the porous catalyst layer is one of a cathode and an anode catalyst layer, or both the cathode and the anode catalyst layers.

* * * * *